United States Patent
Wagner

(10) Patent No.: US 7,234,145 B2
(45) Date of Patent: Jun. 19, 2007

(54) GENERATING XML PAGES FROM PROJECT DATA FROM AN AUTOMATION COMPONENT AND STORING THEM IN A RUN-TIME SYSTEM

(75) Inventor: Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 561 days.

(21) Appl. No.: 10/057,256

(22) Filed: Nov. 13, 2001

(65) Prior Publication Data

US 2002/0112092 A1 Aug. 15, 2002

(30) Foreign Application Priority Data

| Dec. 15, 2000 | (DE) | 100 62 741 |
| Dec. 18, 2000 | (DE) | 100 63 059 |
| Dec. 21, 2000 | (DE) | 100 64 400 |
| May 23, 2001 | (DE) | 101 25 383 |
| May 23, 2001 | (DE) | 101 25 386 |
| Aug. 6, 2001 | (DE) | 101 38 533 |

(51) Int. Cl.
*G06F 3/00* (2006.01)

(52) U.S. Cl. .................................... 719/310

(58) Field of Classification Search ................ 719/310
See application file for complete search history.

(56) References Cited

U.S. PATENT DOCUMENTS

| 5,454,109 | A * | 9/1995 | Bruynooghe et al. | 717/100 |
| 5,878,220 | A * | 3/1999 | Olkin et al. | 709/217 |
| 6,208,345 | B1 * | 3/2001 | Sheard et al. | 715/853 |
| 6,401,094 | B1 * | 6/2002 | Stemp et al. | 707/10 |
| 6,466,971 | B1 * | 10/2002 | Humpleman et al. | 709/220 |
| 6,549,922 | B1 * | 4/2003 | Srivastava et al. | 707/205 |
| 6,954,751 | B2 * | 10/2005 | Christfort et al. | 707/6 |
| 2002/0089470 | A1 * | 7/2002 | Raman et al. | 345/30 |

OTHER PUBLICATIONS

P. B. Taylor, The Gemini Telescope control system, Jun. 3, 1996.*

* cited by examiner

*Primary Examiner*—Sue Lao
*Assistant Examiner*—LeChi Truong
(74) *Attorney, Agent, or Firm*—Baker Botts L.L.P.

(57) ABSTRACT

The access to control data in a run-time system is configured more flexibly where the project data from a control program and the current values from a machine to be controlled are stored in the run-time system in the XML or HTML format. The data can be made available independent of location and for standard browsers via a web server integrated into the run-time system.

13 Claims, 1 Drawing Sheet

GENERATING XML PAGES FROM PROJECT DATA FROM AN AUTOMATION COMPONENT AND STORING THEM IN A RUN-TIME SYSTEM

FIELD OF THE INVENTION

The present invention relates to an apparatus for the open-loop or closed-loop control of a system, having a control device for transmitting and receiving controlled variables to and from the system, and an information preparation device for receiving or extracting project information, in particular from an engineering system, and for exchanging data with the control device. Furthermore, the present invention relates to a corresponding method of exchanging data in the aforementioned apparatuses.

BACKGROUND OF THE INVENTION

Programmable control systems generally contain a run-time system for the timed sequence control of an automation component, a machine or a system, and an engineering system for compiling and editing control programs. The project or project engineering data developed in the engineering system are transferred into the run-time system and used to output the controlled variables. Furthermore, the run-time system taps off current values from the automation component to be controlled and, directly or after buffering in a data store belonging to the run-time system, makes them available to the engineering system. By means of the engineering system, the current values provided can be analyzed and, if necessary, an intervention in the control program is possible.

Typically, status information is output on the run-time system which permits the user to draw conclusions about the state of the control of the automation component. Information which goes beyond the pure operation and observation of the system is generally not displayed on the run-time system. Information of this type is frequently evaluated only when detailed knowledge about the control software is available. As a rule, only service personnel have this detailed knowledge. In order to tap-off such detailed service and diagnostics data, the service personnel use the aforementioned engineering system, with which the control software can then be modified in accordance with the result of the analyzed data. It is therefore necessary for the service personnel to tap-off the detailed diagnostics data from the run-time system on site by means of an engineering system, and to make appropriate changes to the control program.

SUMMARY OF THE INVENTION

The object of the present invention is to configure the actions of tapping-off diagnostic data from the run-time system, and programming the run-time system on site in relation to the data tools, in a more flexible manner. According to the invention, the aforementioned object is achieved by an apparatus for the open-loop or closed-loop control of a system, having a control device for transmitting and receiving controlled variables to and from the system; an information preparation device for obtaining, i.e. receiving or extracting project information, particularly from an engineering system and for exchanging data with the control device; and a data storage device for storing and/or providing project engineering information and data from the control device, via the information preparation device, in a format that can be read by standard Internet clients. By means of this apparatus is data, for example web pages in XML or HTML format, can be stored in the data storage device and can be processed by widespread standard tools with which data in the HTML, XML or another standardized format can be read.

Since the control device is generally not designed to process XML-formatted or similarly formatted data directly, it is preferred if the information preparation device comprises a conversion device. This device converts and back-converts data in a data format that can be read by the control device into the format that can be read by standard Internet clients.

In a preferred embodiment of the present invention the apparatus, in particular the run-time system, can processes project engineering information and provides data from the control device which comprises static and/or dynamic variables. Furthermore, predetermined data, in particular system or user documentation and/or identification information or current values is made available in the data storage device by the apparatus, directly and/or via hyperlinks. On an internal or external display device, static or dynamic data can be mixed in images.

The integration of a web server device for providing data from the information preparation device and/or data storage device for the Internet and/or to pick up data from the Internet proves to be particularly advantageous. The data provided by the web server device can be restricted to operating, observation or service information, for example. In addition, it is further preferred if the apparatus has an engineering system by which the project data can be edited in the format that can be read by standard Internet clients.

BRIEF DESCRIPTION OF THE DRAWING

The present invention is explained in greater detail in connection with the drawing, in which.

DETAILED DESCRIPTION OF THE INVENTION

Figure 1:
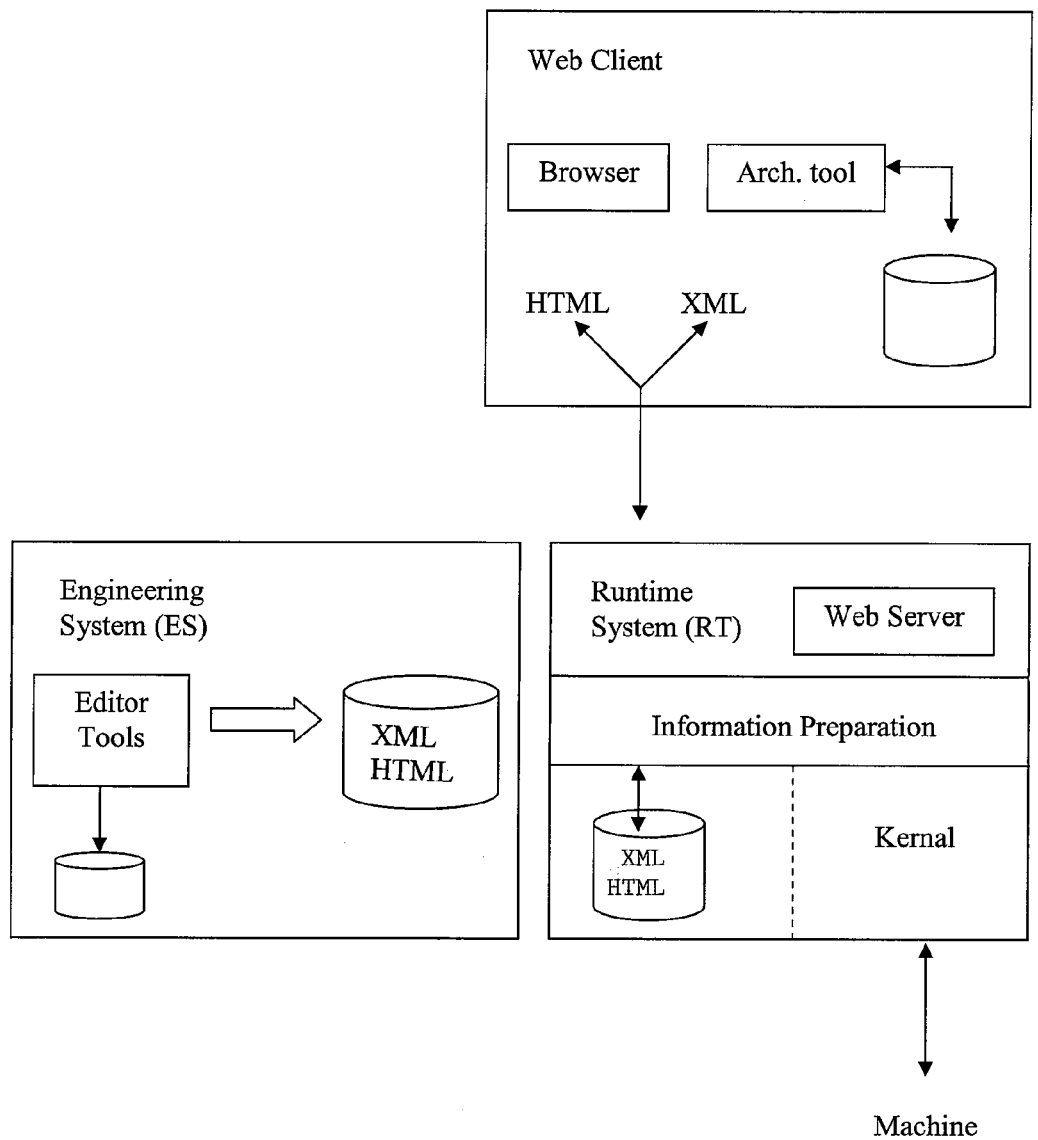
FIG. 1 illustrates the schematic structure of the apparatus according to the invention.

The embodiment of the present invention illustrated in FIG. 1 corresponds to an industrial control or automation component which can optionally be programmed by the user and comprises an engineering system ES and run-time system RT. All the user data generated within the course of engineering are stored in a user project.

During the compilation of a user project for an industrial control or any desired automation component such as a drive, data are generated and processed by the user project with the aid of the engineering system. This project data includes, diagnostic data, service images, display images, specific program or machine variables, system or user documentation (application documentation), hyperlinks comprising system or user documentation and identification information (output levels, versions) of hardware and software components. The project data generated and edited in the engineering system ES are converted into the HTML, XML format or comparable format that can be read by standard Internet clients. The converted data, for example in the XML format, are then transferred into the run-time system RT and stored there in a file system. An information preparation device facilitates the data transfer to the file system, and ensures the exchange of data with the control processor, a/k/a the kernel. The machine to be controlled or the system to be controlled is driven by the kernel, via an interface.

The exchange of information between run-time system RT with web server and the machine is carried out in the following manner: with the aid of the XML and HTML data stored in the run-time system, the information preparation device accesses the interfaces of the control kernel. The stored XML and HTML stored data, includes amongst other things access to dynamic data from the control kernel. This means that a web client can influence data in the run-time system RT by reading and writing by means of access to the web server, since each access runs via the information preparation unit. Alternatively or in parallel, current values can also be stored in any other desired format that can be read by an engineering system ES. If the engineering system is in a position to read and process data in the XML or HTML format, the exchange of data between engineering system ES and run-time system RT can take place via the data formatted as text data. However, the project data in the XML or HTML format stored in the run-time system can also be read and changed by any other desired tools which can process these formats. It is therefore not absolutely necessary for the user to have an engineering system ES in order to observe or to edit project, service and/or diagnostic data.

If the run-time system RT is in a position to provide project data in a format that can be read by standard Internet clients, it is preferred if the run-time system RT (or the industrial controller or automation component) has a web or Internet server, by which the project data can be made available in the Internet. Access can therefore be made to this machine information by using standard browsers. The web client can in turn archive the data obtained in the HTML or XML format via the Internet, process said data and/or send it back to the run-time system.

The diagnostics, service and display images generated within the context of a conventional engineering operation can be designed in an application-specific manner. For example, identification information from the web client can be used for the purpose of restricting or specifically preparing the information made available to the respective web clients by the run-time system. In this way, it is possible to provide a first specific diagnostic data packet to the service personnel responsible for a first machine component, while a different diagnostic data packet is provided to the service personnel responsible for a second machine component. This system for the different provision of data may also be used hierarchically in that, for example, specific monitoring data are provided to the user for remote monitoring, while significantly more detailed data is provided to the service personnel for the remote control of the machine.

An application of the present invention is where the machine to be controlled by the run-time system RT fails and the service personnel is able to read diagnostic data at any desired location and to eliminate the faults with standard tools and without a specific engineering system. However, under certain circumstances this also means that parts of the engineering data have to be accommodated in the run-time system. Therefore, project data such as version information, compilation date, setting parameters, the control object model and the entire user project can be made available to the web client at any desired locations. Furthermore, current data such as cyclic actual values from the industrial controller or automation component, or variables from a user program can also be read-out by the web client, if necessary with proof of authorization. In a display tool which is available to the web client, static and dynamic data can be mixed as desired in the images.

In summary, the embodiment of the present invention described above offers the following advantages:

using the standard engineering system, within the context of the standard engineering operation (commissioning, application compilation), web pages in the XML format or a format that can be read by standard Internet clients are produced from the project engineering information;

the web pages provide any desired information via the control or automation component and/or variables from the user application of the user program;

the web pages generated are stored in the industrial control or automation component;

subsets of the information (for example only service images) can be specified for storage on the controller; and the generation of the web pages can be initiated and/or influenced by the user for different aspects.

I claim:

1. A system for the control of an automation system, comprising an engineering system coupled with a runtime system, and a remote Internet client coupled with said runtime system, wherein the engineering system generates data which are transferred to the runtime system for operating the runtime system, wherein the engineering system is operable to convert data generated to control the runtime system into a format, selected from XML and HTML, that can be read by standard Internet clients, and the runtime system comprises a control processor, an information preparation device for preparing the converted data and for exchanging said prepared data with the control processor, and a data storage device for storing the converted data and for providing said converted data via the information preparation device to said Internet client, wherein the converted data comprises static and/or dynamic variables and wherein the control of the system is selected from an open-loop and closed-loop, and the project information is obtained from an engineering system.

2. The system according to claim 1, wherein only predetermined data is stored in the data storage device.

3. A system according to claim 2, wherein the predetermined data is selected from at least one of the following: system documentation, user documentation and identification information which is stored directly and/or by hyperlinks.

4. The system according to claim 1, further comprising a display device in which static and dynamic data can be mixed in images.

5. The system according to claim 1, further comprising a web server.

6. The system according to claim 5, wherein the web server provides data restricted to operating, observation or service information.

7. A system according to claim 5, wherein the web server has at least one of the following functions: to provide data from the information preparation device for the Internet, to provide data from the storage device for the Internet, and to pick-up data from the Internet.

8. A method for the control of an automation system comprising an engineering system coupled with a runtime system comprising a control processor and an information preparation device, and an remote Internet Client coupled with said runtime system, wherein the engineering generating control data for operating the runtime system, wherein the control of the system is selected from an open-loop and closed-loop, and the project information is obtained from an engineering system, the engineering converters the control data into a format, selected from XML and HTML, that can be read by standard Internet clients, transmitting said converted data to the runtime system, wherein the converted data comprises static and/or dynamic variables, preparing the converted data and exchanging the converted data with the control processor by said information preparation device and storing the converted data in said runtime system, and providing said converted data via the information preration device to said Internet Client and translating said converted data for use within said runtime system.

9. The method according to claim 8, wherein only predetermined data is stored in the run-time system.

10. A method according to claim 9, wherein the predetermined data is selected from system documentation, user documentation and identification information and which is stored directly and/or by hyperlinks.

11. The method according to claim 8, wherein the static and dynamic variables are mixed in images.

12. The method according to claim 8, wherein the data provided for the Internet is restricted to operating, observation or service information data.

13. A method according to claim 8, wherein the control of the system is selected from an open-loop and closed-loop.

* * * * *